United States Patent [19]

Broecker et al.

[11] 3,944,512

[45] Mar. 16, 1976

[54] PROCESS FOR THE MANUFACTURE OF HEAT-CURABLE SYNTHETIC RESINS WHICH CAN BE DILUTED WITH WATER AND ARE SUITABLE FOR THE ELECTROPHORETIC COATING PROCESS

[75] Inventors: Bernhard Broecker, Hamburg; Richard Schardt, Oststeinbek; Gerhard Werner, Glashutten, all of Germany

[73] Assignee: Hoechst Aktiengesellschaft, Germany

[22] Filed: Mar. 11, 1974

[21] Appl. No.: 449,655

[30] Foreign Application Priority Data
Mar. 13, 1973 Switzerland.......................... 3620/73

[52] U.S. Cl. ....................... 260/23.7 R; 260/29.7 D; 260/29.7 NE; 260/78.4 D; 260/845; 260/894; 204/181; 204/185
[51] Int. Cl.² ..................... C08F 8/46; C08F 279/02

[58] Field of Search.......... 260/78.4 D, 23.7 R, 845, 260/879, 894, 29.7 D, 29.7 NE

[56] References Cited
UNITED STATES PATENTS

| | | | |
|---|---|---|---|
| 3,681,276 | 8/1972 | Nagahisa et al................ | 260/23.7 R |
| 3,689,446 | 9/1972 | Furuya et al........................ | 260/23.7 |
| 3,766,215 | 10/1973 | Hesse et al........................ | 260/346.8 |
| 3,778,418 | 12/1973 | Nakayama et al.............. | 260/78.4 D |

*Primary Examiner*—John Kight, III
*Attorney, Agent, or Firm*—Gordon W. Hueschen

[57] ABSTRACT

The present invention relates to a process for the manufacture of heat-curable synthetic resins, based on reaction products of maleic anhydride with mixtures of polybutadiene, unsaturated hydrocarbon resins and unsaturated fatty acid glyceride esters, which can be diluted with water and are suitable for the electrophoretic coating process.

19 Claims, No Drawings

PROCESS FOR THE MANUFACTURE OF HEAT-CURABLE SYNTHETIC RESINS WHICH CAN BE DILUTED WITH WATER AND ARE SUITABLE FOR THE ELECTROPHORETIC COATING PROCESS

BACKGROUND OF THE INVENTION

German Published Spec. No. 2,016,223 describes the manufacture of polymeric products which can be diluted with water and which consist of 10 – 70% by weight of an unsaturated fatty acid ester, 85 – 10% by weight of polybutadiene and 5 – 20% by weight of maleic anhydride. On page 4, last paragraph, of this German Published Specification it is stated that the manufacturing process is carried out by first reacting the unsaturated fatty acid ester and the polybutadiene with one another at 180°– 270°C and then forming the adduct of maleic anhydride. The binders thus obtained are stated to give electrophoretically deposited films which after stoving have improved corrosion protection, better permanent elasticity and good hardness. The bath solutions are stated to have excellent storage stability and the binder is supposed to be capable of trouble-free deposition even at high potentials. However, the binders obtained according to this Published Specification suffer from a series of disadvantages. Thus, the electrophoresis baths prepared with these binders display only inadequate values of the throwing power. On stoving, especially in the case of fairly thick layers (above 24μ), the films show insufficient hardening in depth and the electrophoretically deposited films show marks from drops of water after having been sprayed down with water and then stoved.

These disadvantages are overcome by the synthetic resins manufactured according to the process of the invention. The synthetic resins obtained according to this process display good to excellent values of the throwing power when used as binders in electrophoretic coating baths. The electrophoretically deposited films cure well in depth, on stoving at about 180°C for 30 minutes, even in the case of thick layers (23 – 28 μ). The electrophoretically deposited films can be sprayed down with water and the films show no marks from drops of water after stoving.

British Pat. Specification No. 1,102,652 describes the manufacture of water-soluble binders suitable for the electrophoretic coating process, polybutadiene being reacted with maleic anhydride. These electrophoresis baths prepared with such binders, however, display inadequate values of the throwing power. The films show inadequate hardness after stoving.

British Pat. Specification No. 1,154,174 describes the manufacture of binders which can be diluted with water and are suitable for the electrophoretic coating process, and which consist of 40 – 80% by weight of polybutadiene, 15 – 55% by weight of unsaturated fatty acid and 5 – 15% by weight of fumaric acid. Page 2, lines 38 – 43 of this Patent Specification mentions that hydrocarbon resins based on cyclopentadiene or piperylene can also be added. These binders also show poor values of the throwing power in electrophoresis baths. After spraying down with water and stoving, the films obtained show marks from drops of water and are inadequately hardened in depth.

SUMMARY

The present invention relates to a process for the manufacture of heat-curable synthetic resins, based on reaction products of maleic anhydride with mixtures of polybutadiene, unsaturated hydrocarbon resins and unsaturated fatty acid glyceride esters, which can be diluted with water and are suitable for the electrophoretic coating process, characterised in that a mixture consisting of:

a. 20 – 60% by weight of a polybutadiene having an average molecular weight of 750 – 2,000 and an iodine number between 300 and 450, b. 10 – 60% by weight of a polyisoprene resin having a viscosity between 30 and 800 cP (measured in 70% strength solution in toluene at 20°C) and an iodine number of between 160 and 400, and c. 5 – 40% by weight of a fatty acid glyceride ester, wherein the fatty acid radical contains 16 – 18 C atoms and the fatty acid glyceride ester has an iodine number between 140 and 220, is pre-polymerised by heating to 200°– 270°C until the reaction mixture of components (a), (b) and (c), which has an initial viscosity of about 100 – 300 sec (measured according to DIN 53,211), displays viscosities between 500 and 2,000 sec (measured according to DIN 53,211), the resulting mixture is then reacted with d. 10 – 20% by weight of maleic anhydride at 180°– 190°C, until no further free maleic anhydride is present, and e. in the resulting adduct the anhydride groups present are opened by hydrolysis with water or alcoholysis with the amount of monohydric alcohols with 1 – 4 C atoms required to form the half-ester.

In the process of the present invention, it is possible to use, as component (a), polybutadienes in the form of homopolymers of butadiene with an average molecular weight of 750 – 2,000 and iodine numbers between 300 and 450.

By polybutadienes there are to be understood all commercially available isomers, both those with cis- and trans-double bonds in the middle position and those with vinyl double bonds. The following are particularly preferred:

1. a polybutadiene of average molecular weight approx. 1,400 and iodine number 450, wherein 65 – 75% of the double bonds have the 1,4-cis configuration, 25 – 35% have the 1,4-trans configuration and less than 1% have the 1,2-vinyl configuration;

2. a polybutadiene of average molecular weight 1,000 to 1,500 and iodine number 420, wherein 10% of the double bonds have the 1,4-cis configuration, 45% have the 1,4-trans configuration and 45% have the 1,2-vinyl configuration;

3. a polybutadiene with a mean molecular weight of 900 and an iodine number of 360, the double bonds having the 1,4-cis configuration to the extent of 10%, the 1,4-trans configuration to the extent of 45% and the 1,2-vinyl configuration to the extent of 45%.

Under polybutadienes there are also to be understood butadiene polymers with terminal carboxyl groups or hydroxyl groups, but these do not belong to the preferred embodiment. The manufacture of these butadiene polymers with terminal carboxyl groups or hydroxyl groups is described in "Rubber and Plastics Age", 1964, volume 45, No. 11, page 1,347.

Suitable components (b) are unsaturated polyisoprene resins which are obtained by polymerisation of isoprene. These isoprene resins should have iodine numbers between 160 and 400 and viscosities between 30 and 800 cP (measured in 70% strength solution in toluene at 20°C). Isoprene resins having viscosities between 30 and 200 cP are especially suitable.

Suitable unsaturated fatty acid glyceride esters are the triglycerides of unsaturated fatty acids, such as tall oil fatty acid, soya oil fatty acid, linseed oil fatty acid, dehydrated castor fatty acid, wood oil fatty acid, groundnut fatty acid, rape oil fatty acid and the like, linseed oil, wood oil and dehydrated castor oil being particularly preferred. In the most preferred embodiment linseed oil is used as the unsaturated fatty acid glyceride ester.

The polybutadiene $(a)$, the polyisoprene resin $(b)$ and the fatty acid glyceride ester $(c)$ are first heated to 200°– 270°C under a protective gas. Nitrogen or carbon dioxide are suitable protective gases. Heating is continued until the viscosity, of samples which are withdrawn, has risen from 100 – 300 sec to 430 – 2,000 sec (DIN 53,211). Higher viscosities than those mentioned should be avoided since at higher viscosities the addition of maleic anhydride is frequently no longer possible without danger of gelling, or the films applied electrophoretically using such products do not have adequate levelling.

If the viscosities of the intermediate product are too low, the values of the throwing power of the end product are in general inadequate and the films are very sensitive to marks from drops of water. The initial viscosities of the mixture of components $(a) - (c)$ are between 100 and 300 sec (DIN 53,211). After the desired final viscosity has been reached, the polymerised mixture is reacted with maleic anhydride. This reaction is carried out at 180°– 190°C, it being necessary to take great care that the temperature does not go outside this range.

At lower temperatures, the addition does not take place sufficiently rapidly whilst at higher temperatures there is a danger of the batches gelling.

Preferably, polymerisation inhibitors, for example hydroquinone, tert.-amyl hydroquinone, diphenylamine, diephenylenediamine, copper or copper salts, for example copper naphthenate, are added to the reaction batch. The reaction is continued until the free maleic anhydride content has fallen to 0%. In general, 3 – 8 hours are required for this purpose. Thereafter, the anhydride group in the reaction product (adduct) is opened either by treatment with water (hydrolysis) optionally under raised pressure or by treatment with saturated aliphatic monohydric alcohols (alcoholysis) with 1 – 4 C atoms, forming the half-ester.

These two reactions are preferably accelerated by the addition of catalytic amounts of tertiary amines such as triethylamine, tributylamine and the like, and are carried out at 80°– 120°C. In general, a time of 1 – 2 or more hours is required for this purpose.

The viscosities of the end products are between 40 and 152 seconds ((DIN 53,211), measured at 50% strength by weight in ethylene glycol monobutyl ether) and the acid numbers should be between 60 and 140.

After the opening of the anhydride group, the resulting synthetic resins are diluted with water-soluble solvents and/or solvents of only limited solubility in water. Suitable solvents are, for example, ethanol, propanol, isopropanol, ethylene glycol monomethyl ether, monoethyl ether, monoisopropyl ether and monobutyl ether and also butanol, diethylene glycol, monoethers and diethers of diethylene glycol, methyl ethyl ketone, diacetone alcohol and dimethyl-sulphoxide.

Minor proportions of water-insoluble solvents such as xylene, benzine, cyclohexanol, cyclohexanone, nonanol and decanol can be used conjointly. The total proportion of solvents should not exceed 30 parts by weight (relative to 100 parts by weight of binder solution), and the proportion of water-insoluble solvents should be at most 20 parts by weight of the amount of solvent employed.

In order to convert the resulting synthetic resin solution into a state where it can be diluted with water, the solution is neutralised almost completely, or partially. Preferably, ammonia is used for this purpose. Strong organic nitrogen bases of which a 10% strength by weight aqueous solution has a pH of at least 8, are also suitable. For example, amines such as, for example, dimethylamine and trimethylamine, triethylamine, diethylamine, propylamine, butylamine, diethanolamine, triethanolamine, N-methylethanolamine, N,N-dimethylethanolamine and diisopropanolamine can be used as strong organic nitrogen bases. Alkalis such as sodium hydroxide or potassium hydroxide are also suitable.

All customary pigments, fillers and lacquer auxiliaries can be used for pigmenting the binders. Only the use of basic pigments such as, for example, zinc oxide, requires careful testing in each individual case.

The synthetic resins manufactured according to the invention are particularly suitable for use as binders for the electrophoretic lacquering process, for which the electrophoresis baths should have a total solids content between 7 and 20% by weight.

The synthetic resins manufactured according to the invention are intended to be used as binders for lacquers.

However, these lacquers can also be applied by spraying, dipping or flooding onto the articles to be lacquered. The stoving temperature after application is about 170°– 180°C for 30 minutes.

In a preferred embodiment of the invention, the synthetic resin obtained according to the process of the invention should contain the components used in the following percentages a. 20 – 60% by weight of polybutadiene,
b. 10 – 60% by weight of polyisoprene resin,
c. 5 – 40% by weight of unsaturated oil and
d. 10 – 20% by weight of maleic anhydride.

In the most preferred embodiment of the invention, the synthetic resin obtained according to the process of the invention should contain the components used in the following percentages:

a. 45 – 50% by weight of polybutadiene,
b. 15 – 20% by weight of polyisoprene resin,
c. 15 – 20% by weight of unsaturated oil and
d. 17.5 – 20% by weight of maleic anhydride.

In another preferred embodiment of the invention, the proportion of component $(a)$ is between 35 and 60% by weight, component $(b)$ lies in the range of 20 to 25%, component $(c)$ is between 15 and 30% by weight and component $(d)$ about 15% by weight. The proportions used depend on the desired properties of the binder. Thus, proportions of component $(b) > 25\%$ by weight admittedly give binders with very good values of the throwing power, but the mechanical properties of the films produced after stoving are unsatisfactory. Proportions of component $(c) > 30\%$ by weight in general cause a deterioration of the corrosion resistance of the films produced by stoving. Proportions of component (d) > 20% by weight lead to binders which in electrophoresis baths display very high conductivities and which frequently can only be deposited electrophoretically with flaws in the film.

In the above-mentioned preferred or most preferred embodiments of the invention, respectively, linseed oil is employed as the unsaturated oil.

The process of the invention is best carried out as follows. Components (a.) to (c.) are mixed under inert gas and then pre-polymerized to the desired viscosity by heating to 250°– 270°C. After cooling to 120°– 140°C the maleic anhydride and the inhibitor are added. After decay of the exotherme reaction the reaction is carried on at 180°– 190°c until the content of free maleic anhydride has fallen to zero. Air has to be kept out of the reacting flask and the reaction should not be interrupted after addition of the maleic anhydride. Thereafter the resin is cooled to 80°C and the water or alcohol, respectively, is added for cleavage of the anhydride group. The reaction (alcoholysis) with alcohol works without problems in the course of 1 – 2 hours at 80° to 100° C; the reaction with water (hydrolysis) takes longer time (2 – 3 hours) at 100° C, whereby the use of raised pressure is advantageous. Thereafter the mix is diluted with solvent at 60°– 70°C.

Manufacture of polyisoprene resin 1 (component b):

500 g of toluene are cooled to +5°C whilst stirring. 1,500 g of isoprene and a solution of 30 g of boron trifluoride in 800 g of toluene are added dropwise simultaneously thereto, the temperature not being allowed to rise above 10°C. The reaction is then allowed to continue for a further 3 hours at 10°C, and 100 g of sodium bicarbonate and 2 g of water are added. The mixture is then filtered and concentrated. 950 g of polyisoprene resin having a viscosity of 150 cP (measured at 70% strength by weight in toluene at 20°C) and an iodine number of 285 remain.

Manufacture of polyisoprene resin 2:

The procedure followed is as in the preceding instruction for polyisosprene resin 1, except that the post-reaction time is shortened to 30 minutes at 10°C. 550 g of polyisoprene resin having a viscosity of 56 cP (measured at 70% strength by weight in toluene at 20°C) and an iodine number of 240 remain.

EXAMPLE 1

500 g of a polybutadiene of iodine number 450 and average molecular weight approx. 1,400 with double bonds having the 1,4-cis configuration to the extent of 65 – 75%, the 1,4-trans configuration to the extent of 25 – 35% and the 1,2-vinyl configuration to the extent of below 1%, are mixed with 200 g of the unsaturated polyisoprene resin 1 and 150 g of linseed oil. The viscosity of the mixture is 130 sec. The batch is heated to 250°C under inert gas until the viscosity according to 4 DIN 53,211 is 890 sec. 150 g of maleic anhydride are then added all at once at 160°C and the temperature is kept at between 180° and 190°C until the content of free maleic anhydride is practically zero. 60 g of methanol and 0.5 g of triethylamine are then added at 80° C and the temperature is raised to 100°C for one hour. This has opened the anhydride groups in the adduct. The synthetic resin is then diluted with ethylene glycol monoethyl ether to a solids content of 75% by weight.

The synthetic resin is neutralised, applied electrophoretically in layer thickness of 25 μ and stoved (30 mins at 180°C) to give a lacquer film having very good corrosion resistance in the salt spray test, and good elasticity. The electrophoresis bath possesses good throwing power.

EXAMPLE 2

300 g of the polybutadiene described in Example 1 and 350 g of the unsaturated polyisoprene resin 2 are mixed with 150 g of linseed oil, the viscosity of the batch being 190 sec. The batch is heated to 250°C under an inert gas ($CO_2$) until the viscosity according to DIN 53,211 is 1,150 sec. It is then cooled to 160°C. Thereafter, 200 g of maleic anhydride are added at 160°C and the reaction is carried out at 180°– 190°C until the content of free maleic anhydride has fallen practically to zero (in about 4 hours). 38 g of water and 0.5 g of triethylamine are then added to the resin at 100°C and the mixture is heated for 2 hours at 100°C until all the anhydride groups have been opened.

It is then diluted with ethylene glycol monoethyl ether to a solids content of 75% by weight.

The synthetic resin is neutralised, applied electrophoretically as a clear lacquer onto steel sheets and stoved (30 mins at 170°C) to give a hard film which proves corrosion-resistant in the salt spray test (ASTM B 117-64). The electrophoresis bath prepared from the resin shows excellent values of the throwing power.

COMPARISON TESTS TO PROVE THE ADVANCE OVER THE ART

Comparison experiment A

Following the procedure of German Pat. No. 2,016,223, 400 parts of a polybutadiene of iodine number 450 and average molecular weight approx. 1,400 and 183 parts of soya oil were heated to 260°C until the viscosity (measured at 70% strength by weight in xylene) had risen to 25 seconds according to DIN 53,211 (corresponding to 1,600 seconds measured directly according to DIN 53,211). 10 g of copper naphthenate (Cu content 8% by weight) were added, followed by 75 g of maleic anhydride. After 40 minutes at 190°C, the batch gelled.

Comparison experiment B

The procedure followed was as in comparison experiment A, but the soya oil was replaced by an equal amount of linseed oil. After 30 minutes at 190°C, the batch gelled.

Comparison experiment C

The procedure followed was as in comparison experiment B but a polybutadiene having an average molecular weight of 1,000 – 1,500 and an iodine number of 357, and containing 45% by weight of vinyl groups, 45% by weight of trans structures and 10% by weight of cis structures was used. After a reaction time of 4 hours at 190°C the content of non-bonded maleic anhydride had fallen to zero. The anhydride groups were opened by treatment with water and keeping the mixture at 100°C. The resulting synthetic resin was diluted to a solids content of 75% by weight with ethylene glycol monoethyl ether. The synthetic resin was pigmented with a mixture of equal parts of titanium dioxide and aluminum silicate and a little carbon black, using a pigment/binder ratio of 0.3 : 1, and after neutralisation with ammonia the whole was diluted to a solids content of 13% by weight. This electrophoresis bath is compared with a bath prepared in the same manner, to which the synthetic resin described in Example 1 was added as the binder.

|  |  | Binder according to comparison experiment C | Binder according to Example 1 |
|---|---|---|---|
| Curing in depth at 20 μ layer thickness |  | good | good |
| Curing in depth at 25 μ layer thickness | on pickled steel | inadequate | good |
| Marks from drops of water |  | strong | slight |
| Throwing power* |  | 20/20/15/12 | 20/8/2/0 |

*A 50 cm long and 5 cm wide steel strip is introduced into a plastic tube of 6 cm diameter which carries a disc-shaped copper cathode at the bottom, in such a way that the distance of the strip from the cathode is 2 cm.

The deposition is carried out at such a voltage that a thickness of 20 μ was reached 2 cm from the lower edge of the steel strip. The layer thickness at 15, 30 and 45 cm distance is measured.

The invention also relates to the use of the synthetic resins, which can be diluted with water, manufactured according to the present process, for the manufacture of unpigmented, pigmented and/or filled heat-curable coating agents, the resins being used as the sole binder or mixed with other binders.

In a special use of the synthetic resins manufactured according to the invention, relatively low molecular, at least hydrophilic, heat-curable condensation products, such as reaction products which form aminoplasts, and/or phenol-resols and/or etherified phenol-resols, are co-used as further binders for coating agents which can be stoved.

These other binders are explained in detail in Swiss Pat. No. 523,929, column 8, line 47 to column 10, line 19.

In a further special application, such synthetic resins are used for the electrophoretic coating process, phenoplasts and/or aminoplasts being co-used as other binders, these having been combined with the synthetic resins obtained according to the process of the present invention, prior to neutralisation, by warming at temperatures of 100°– 150°C so that pre-condensation takes place.

With regard to how to carry out the pre-condensation, reference should be made to the comments in Swiss Pat. Specification No. 523,929, column 10, line 20 to line 57, which reads:

In the new polyether-ester carboxylic acid resins we prefer combinations which contain 10 to 30% by weight of aminoplast-forming or phenoplast-forming condensation products, with respect to the solid content.

For the electrophoretic application process an advantage is gained if the heat-curable condensation products of the kind already described above, that is to say phenoplasts and/or aminoplasts, are not merely added to and mixed with the resins of the present invention before neutralization, but the components are subjected to a reaction. The reaction, which can be called precondensation, generally takes place at temperatures from 100° to 150°C, and it is necessary to carry out the reaction in a suitable way so as to ensure as far as possible that poly-etherification and not esterification of the components takes place. A suitable method of carrying out the reaction consists for instance in reacting the components in the presence of an acid catalyst such as phosphoric acids, p-toluenesulphonic acid, or benzoic acid, at temperatures between 100° and 150°C. In this process the heating is stopped at once when the acid value has decreased by about 10 units as compared with the initial acid value of the reaction mixture. This may preferably be achieved by using etherified hydrophilic, heat-curable condensation products as phenoplasts and/or aminoplasts. In order to obtain adequate ether conversion it is also advantageous to carry out the reaction under vacuum.

The usual methods can be used in applying the combined stoving lacquers made from the resins of the present invention to the objects to be lacquered; they are more particularly suitable for lacquering sheet metal. In regard to this the lacquers have a particular advantage in that they can be deposited on the sheet metal by the electrophoretic process. The stoving of the lacquers can be carried out at temperatures of about 80° to 200° and preferably about 100° to 180°C and during a time of about 10 to 80 and preferably about 20 to 60 minutes, depending on the stoving temperature.

| Example | Polybutadiene % by weight (as in Example 2) | Polyisoprene resin % by weight | Linseed oil % by weight | Wood oil % by weight | Pre-polymerised to a viscosity of ... sec according to DIN 53,211 | maleic anhydride % by weight | Anhydride group opened with |
|---|---|---|---|---|---|---|---|
| 3 | 50 | 20 ++) | 12.5 | — | 1200 | 17.5 | $CH_3OH$ |
| 4 | 50 | 20 ++) | 12.5 | — | 1000 | 17.5 | $H_2O$ |
| 5 | 40 | 20 ++) | 20 | — | 1137 | 20 | $CH_3OH$ |
| 6 | 40 | 25 +) | 15 | — | 1100 | 20 | $CH_3OH$ |
| 7 | 45 | 15 ++) | 10 | 10 | 1200 | 20 | $CH_3OH$ |
| 8 | 45 | 15 ++) | 20 | — | 1200 | 20 | n-propanol |
| 9 | 40 | 30 ++) | 12.5 | — | 950 | 17.5 | $CH_3OH$ |
| 10 | 35 | 30 +) | 5 | 10 | 800 | 20 | $CH_3OH$ |
| 11 | 30 | 40 +) | 12.5 | — | 950 | 17.5 | $CH_3OH$ |

+) means polyisoprene resin 1
++) means polyisoprene resin 2

| Example | polybuta-diene % by weight (as in Example 2) | polyisoprene resin % by weight | oil % by weight | pre-polymerised to a viscosity of . . . sec according to DIN 53,211 | maleic anhydride % by weight | anhydride group opened with |
|---|---|---|---|---|---|---|
| 12 | 45 | 20 +) | 15 soya oil | 1050 | 20 | CH$_3$OH |
| 13 | 45 | 20 +) | 15 colza oil | 1020 | 20 | CH$_3$OH |
| 14 | 45 | 20 +) | 15 tall oil fatty acid tri-glyceride ester | 950 | 20 | CH$_3$OH |
| 15 | 45 | 20 +) | 15 peanut oil fatty acid tri-glyceride ester | 920 | 20 | CH$_3$OH |
| 16 | 45 | 20 +) | 7.5 soya oil 7.5 linseed oil | 1000 | 20 | CH$_3$OH |

+) means polyisoprene resin 1

| Example | polybutadiene % by weight | polyisoprene resin % by weight | oil % by weight | pre-polymerised to a viscosity of . . . sec according to DIN 53,211 | maleic anhydride % by weight | anhydride group opened with |
|---|---|---|---|---|---|---|
| 17 | 45 iodine number 420 10 % 1,4-cis 45 % 1,4-trans 45 % 1,2-vinyl molecular weight 1000 – 1500 | 17.5 ++) | 20 soya oil | 1200 | 17.5 | CH$_3$OH |
| 18 | 45 iodine number 360 10 % 1,4-cis 45 % 1,4-trans 45 % 1,2-vinyl molecular weight 900 | 17.5 ++) | 20 soya oil | 1000 | 17.5 | CH$_3$OH |
| 19 | the instructions of Example 1 are followed | | | | | ethanol |
| 20 | the instructions of Example 1 are followed | | | | | n-butanol |
| 21 | the instructions of Example 1 are followed | | | | | sec-butanol |
| 22 | the instructions of Example 1 are followed | | | | | isobutanol |

++) means polyisoprene resin 2

The above Examples 3 – 22 were made according to instructions given in Example 1, however, by using the raw materials and the amounts as mentioned in the Table above.

What is claimed is:

1. The process for the manufacture of heat-curable synthetic resins, based on reaction products of maleic anhydride with mixtures of polybutadiene, unsaturated hydrocarbon resins and unsaturated fatty acid glyceride esters, which can be diluted with water and are suitable for the electrophoretic coating process, characterised in that a mixture consisting of a. 20–60% by weight of a polybutadiene having a number average molecular weight of 750–2,000 and an iodine number between 300 and 450,
   b. 10–60% by weight of a polyisoprene resin having a viscosity between 30 and 800 cP (measured in 70% strength solution in toluene at 20°C) and an iodine number of between 160 and 400, and
   c. 5–40% by weight of a fatty acid glyceride ester, wherein the fatty acid radical contains 16–18 C atoms and the fatty acid glyceride ester has an iodine number between 140 and 220, is pre-polymerised by heating to 200°–270°C until the reaction mixture of components (a), (b) and (c), which has an initial viscosity of about 100 to 300 sec (measured according to DIN 53,211), displays viscosities between 500 and 2,000 sec (measured according to DIN 53,211), the resulting mixture is then reacted with d. 10–20% by weight of maleic anhydride at 180°–190°C until no further free maleic anhydride is present, and the sum of the percents by weight of components (a), (b), c), and (d) being 100 percent by weight,
   e. in the resulting adduct the anhydride groups present are opened by hydrolysis with water or alcoholysis with the amount of monohydric alcohols with 1–4 C atoms required to form the half-ester.

2. Process according to claim 1, characterised in that polybutadienes, homopolymers of butadiene with an average molecular weight of 750 – 2,000 and iodine numbers of between 300 and 450 are employed as component (a).

3. Process according to claim 2, characterised in that polybutadienes, all commercially available isomers, both those with cis and trans double bonds in the middle position and also those with vinyl double bonds, are employed.

4. Process according to claim 2, characterised in that a polybutydiene with an average molecular weight of about 1,400 and an iodine number of 450, 65 – 75% of the double bonds being in the 1,4-cis configuration, 25 – 35% in the 1,4-trans configuration and less than 1% in the 1,2-vinyl configuration, is employed.

5. Process according to claim 2, characterised in that a polybutadiene with an average molecular weight of 1,000 – 1,500, and an iodine number of 420, 10% of the double bonds being in the 1,4-cis configuration, 45% in the 1,4-trans configuration and 45% in the 1,2-vinyl configuration, is employed.

6. Process according to claim 2, characterised in that butadiene polymers with terminal carboxyl groups or hydroxyl groups are employed.

7. Process according to claim 1, characterised in that triglycerides of unsaturated fatty acids, such as tall oil fatty acid, soya oil fatty acid, linseed oil fatty acid, dehydrated castor fatty acid, wood oil fatty acid, groundnut fatty acid, rape oil fatty acid and the like, and particularly preferentially linseed oil, wood oil and/or castor oil, are employed as unsaturated fatty acid glyceride esters.

8. Process according to claim 1, characterised in that the hydrolysis or alcoholysis is carried out at 80° – 120°C and is accelerated by addition of catalytic amounts of tertiary amines.

9. Process according to claim 1, characterised in that end products with viscosities of between 40 and 152 seconds (DIN 53,211) measured at 50% strength by weight in ethylene glycol monobutyl ether) and acid numbers of between 60 and 140 are manufactured through choice of the reactants and of the reaction time.

10. Process according to claim 1, characterised in that after the opening of the anhydride group (by hydrolysis or alcoholysis) the resulting synthetic resins are diluted with solvents which are water-soluble and/or only have limited solubility in water.

11. Process according to claim 10, characterised in that minor proportions of water-insoluble solvents are coused, but the total proportion of solvents does not exceed 30 parts by weight (relative to 100 parts by weight of binder solution) and the proportion of water-insoluble solvents is at most 20 parts by weight of the amount of solvent employed.

12. Process according to claim 1, characterised in that the components are employed in the following percentages a. 20 – 60% by weight of polybutadiene,
b. 10 – 60% by weight of polyisoprene resin,
c. 5 – 40% by weight of unsaturated oil and
d. 10 – 20% by weight of maleic anhydride the sum of the amounts employed having to add up to 100% by weight.

13. Process according to claim 1, characterised in that polybutadiene with a mean molecular weight of 900, an iodine number of 360 is employed, the double bonds having the 1,4-cis configuration to the extent of 10%, the 1,4-trans configuration to the extent of 45% and the 1,2-vinyl configuration to the extent of 45%.

14. Process for preparing a heat-curable, pigmented or unpigmented coating composition which comprises using as a binder therein a synthetic resin manufactured according to the process of claim 1.

15. Process according to Patent claim 14, wherein the synthetic resins employed for the coating composition for the electrophoretic coating process having acid numbers between 60 and 140.

16. Process according to claim 14, wherein the coating compositions used for electrophoretic application having a total solids content of between 7 and 20% by weight.

17. Process according to claim 14, wherein synthetic resins with viscosities between 40 and 152 sec (DIN 53,211), measured 1 : 1 in ethylene glycol monobutyl ether at 20°C, are used.

18. Process according to claim 14, wherein relatively low molecular, at least hydrophilic, heat-curable condensation products, such as reaction products which form aminoplasts, and/or phenol-resols and/or etherified phenol-resols, are co-used as further binders for coating agents which can be stoved.

19. Synthetic resin manufactured by the process of claim 1.

* * * * *